United States Patent
Al Ghatta et al.

[11] Patent Number: 5,776,994
[45] Date of Patent: Jul. 7, 1998

[54] POLYESTER RESINS HAVING IMPROVED RHEOLOGICAL PROPERTIES

[75] Inventors: Hussain Al Ghatta, Fiuggi; Sandro Cobror, Pozzilli, both of Italy

[73] Assignee: Sinco Engineering S.p.A., Italy

[21] Appl. No.: 824,365

[22] Filed: Mar. 25, 1997

[51] Int. Cl.[6] .......................... C08G 63/00; C08F 20/00
[52] U.S. Cl. .......................... 521/182; 528/298; 528/302; 528/308; 528/308.6; 525/439; 525/444; 521/182
[58] Field of Search .......................... 528/298, 302, 528/308, 308.6; 525/439, 444; 521/182

[56] References Cited

U.S. PATENT DOCUMENTS

| | | | |
|---|---|---|---|
| 4,358,563 | 11/1982 | Quinn et al. | 525/146 |
| 4,559,388 | 12/1985 | Liu et al. | 525/146 |
| 4,960,839 | 10/1990 | Rosenquist | 525/462 |
| 4,983,648 | 1/1991 | Laughner et al. | 523/351 |
| 5,064,914 | 11/1991 | Rosenquist et al. | 525/439 |
| 5,262,476 | 11/1993 | Laughner | 525/67 |
| 5,288,764 | 2/1994 | Rotter et al. | 521/81 |

*Primary Examiner*—Samuel A. Acquah
*Attorney, Agent, or Firm*—Edward D. Manzo; Mark J. Murphy

[57] ABSTRACT

Concentrates of dianhydrides of tetracarboxylic acids in polycarbonate resins containing up to about 50% by weight of dianhydride. The concentrates can be added to aromatic polyester resins in the melt in quantities equivalent to contents of dianhydride from 0.05 to 2% by weight of the resin.

20 Claims, No Drawings

POLYESTER RESINS HAVING IMPROVED RHEOLOGICAL PROPERTIES

The present invention refers to compositions of aromatic polyester resins having improved rheological characteristics and the concentrates containing polyfunctional compounds utilized in the preparation of the compositions.

It is known that the rheological properties of the aromatic polyester resins can be improved by adding to the melt, polyfunctional compounds particularly chosen between the dianhydrides of tetracarboxylic acids.

Pyromellitic dianhydride (PMDA) is a representative compound.

The direct addition of the polyfunctional compounds to the melt of the polyester resins during the extrusion phase of the same, presents various inconvenients such as the formation of gels and the dishomogeneity of the extruded material due to the instability of the process manifested with variations also remarkable of the intrinsic viscosity and the melt viscosity.

It is known that the addition of the polyfunctional compound in the form of a concentrate (masterbatch) to the polyester resin in concentrations superior to 2% by weight preferably comprised from 8 and 12% by weight (U.S. Pat. No. 5,288,764) or in a polyolefinic polymer in concentrations up to about 50% by weight (WO-A-95/09884), tends to reduce the inconvenients mentioned above and can also improve the rheological properties of the melt.

The use of the polyester resins for the preparation of the concentrates does not eliminate, however, the reactions that bring about the formation of gels; instead, the use of the polyolefins involves the possibility of degradation of the same at the working temperatures of the polyester resins and therefore the necessity to introduce stabilizers and similar additives.

It has now been found that the addition to the aromatic polyester resins of polyfunctional compounds chosen from the dianhydrides of tetracarboxylic acids, preferably of aromatic tetracarboxylic acids, in the form of concentrates in polycarbonate resins not only avoids the formation of gels and the instability of the extrusion process, but also remarkably improves the Theological characteristics of the resin, in particular remarkably improves the melt strength, the hanging time, the die swell and the intrinsic viscosity of the same.

The improvement of the Theological properties is particularly high in the case of copolyethylene terephthalate containing minor proportions (from about 1 to 25% by moles) of recurring units deriving from isophthalic acid or other aromatic bicarboxylic acids.

Thanks to the increase of the above mentioned characteristics, the thus obtained resins find advantageous applications particularly in the area of expanded materials, besides the preparation of films or containers by extrusion blow molding.

It has been found that the addition of the polycarbonate to the resin pretreated with the dianhydride or of the polycarbonate and the dianhydride separately to the melted resin in the extrusion phase, does not bring a significant improvement of the Theological properties in the case of polyethylene terephthalate or polybutylene terephthalate and similar homopolymers while the improvements are comparable with those obtainable with the concentrates when the resin is a copolyethylene terephthalate containing preferably 1–20% by moles of recurring units deriving from isophthalic acid.

The quantity of dianhydride added to the polycarbonate is superior to 1% by weight, preferably comprised between 5 and 20% by weight. Higher quantities up to about 50% by weight are possible, but do not bring about any particular advantage.

The preferred dianhydride is pyromellitic dianhydride (PMDA). Examples of other dianhydrides usable are the dianhydrides of acids 3,3', 4,4' diphenyl tetracarboxylic, 3,3' 4,4' benzophenone dicarboxylic, 2,2 bis (3,4-dicarboxylphenyl) ether, bis (3,4-dicarboxylphenyl) thioether, tetrahydrofuran tetracarboxylic, 2,3,6,7-naphthalene tetracarboxylic, bis (3,4-dicarboxylphenyl) sulfone, cyclopentane tetracarboxylic, cyclobutane tetracarboxylic.

The concentrate is then added to the resin in quantities such to have a content of dianhydride comprised from about 0.04 to 2% by weight, preferably 0.05–0.5% by weight.

The preparation of the dianhydride/polycarbonate concentrate is preferably carried out by mixing the components in the melt state, operating in an extruder preferably of the type counter rotating and intermeshing twin screw extruder, with residence time of about 1–2 minutes.

The granules obtained are then mixed in the melt state with the polyester resin and the composition obtained is then molded or extruded to obtain articles such as films, fibres, beverage containers, foamed panels.

The resin added with the concentrate of polyfunctional substance can be extruded and granulated and the granules mixed with polyester resin granules or added to the resin in the extrusion phase.

A convenient application of the resin added with concentrates of the invention is the preparation of foamed articles. The high characteristics of the melt strength, hanging time and of die swell obtainable with the compositions of the invention allow in fact to directly obtain by extrusion/foaming, foamed material endowed of valuable expansion properties.

The technique used for the expansion is the conventional one described in literature; foaming agents used are physical agents, such as inert gases for example nitrogen, carbon dioxide or aliphatic hydrocarbons such as pentane, isopentane or also chemical foaming agents.

Inert gases are preferred

The aromatic polyester resins used for the preparation of the compositions of the invention are the product of the polycondensation of aromatic dicarboxylic acids and their derivatives such as methyl ester with diols with 2–10 carbon atoms.

Terephthalic acid, naphthalene dicarboxylic acids and their dimethyl ester are preferred compounds. The diols are preferably chosen between ethylene glycol, 1,4 butanediol, 1,4 cyclohexosidimethylol. The polyesters may be homopolymers or copolymers containing up to about 50% by moles of other dicarboxylic acids or diols.

Polyethylene terephthalate and the relative copolymers containing up to about 25% by weight of the units deriving from isophthalic acid or from naphthalene dicarboxylic acids such as the isomers 2,6 2,7 1,5 and 1,6 are preferred. Aromatic polyesters with elastometric properties are also used.

The polyester resins are prepared according to conventional procedures, by means of polycondensation in the melt state and possibly a successive polycondensation in the solid state to increase the intrinsic viscosity of the resin.

The intrinsic viscosity of the resin used in the preparation of compositions of the invention are in general superior to 0.4 dl/g and comprised between 0.6 and 0.8 dl/g. The intrisic viscosity is increased to values of 0.7–0.8 dl/g or higher carrying out the extrusion in the presence of the concentrate

3 of the invention. Further increases can be obtained by polycondensation in the solid state of the resin added with the concentrate operating according to conventional methods.

The polycarbonates used are well known in the literature. They are prepared by reaction of phenols such as bisphenol A (2.2-bis (4-hydrophenyl) propane), bis (4-hydrophenyl) methane, 4,4' bis (4-hydroxyphenyl) heptane), with carbonate precursors such as carbonyl chloride, diphenyl carbonate, di (alkyphenyl) carbonates and similar (U.S. Pat. No. 4,598,129).

The polycarbonates can be in form of homopolymers or copolymers and have an intrinsic viscosity in methylene chloride at 25° C. comprised in general between 0.4 and 1.2 dl/g. The pondered average molecular weight is in general comprised between 20,000 and 40,000 g/mole. Polycarbonate copolymers such as those described in U.S. Pat. No. 4,598,129 and U.S. Pat. No. 3,169,121 can also be used.

The following examples are provided to illustrate but not to limit the invention.

The intrinsic viscosity of the polyester resin reported in the text and in the examples was determined dissolving 0.5 g of polymer in 100 ml of a 60/40 weight mixture of phenol and tetrachloroethane, operating at 25° C. according to ASTMD-4603-86.

EXAMPLE 1

5 kg/h polycarbonate granules (Dow Calibre 0201-10) were continuously fed (after drying under vacuum at 130° C. for at least 12 h) together with 5% by weight of pyromellitic dianhydride (PMDA) in a counter rotating and intermeshing twin screw extruder and extruded and pelletized.
The conditions adopted were:
Speed of the screw: 100 rpm
Cylinder temperature: 280°–285° C.
Feeding of the granules: 5 kg/h
Type of mold: round with 2 mm diameter
PMDA feeding: 0.25 kg/h
Residence time in the extruder: 1 minute
Melt strength after extrusion: inferior to 1 cN at 290° C. and hanging time of 3 seconds.

The measure of the melt strength was carried out with a Gottfert Rheotens equipment operating at 2900° C. (piston speed 0.2 mm/sec.; mold dimensions: 2 mm).

The hanging time was determined measuring the time (in seconds) necessary to cover a distance of 10 cm for the polymer melted at 290° C. exiting from the capillary of the Gottfert Rheotens equipment used to measure the melt strength.

A determination of the terminal COOH groups indicates that at least 80% of the PMDA added is present in the free state. The concentrate was dissolved in dichloromethane: 140 mg in 25 ml $CH_2Cl_2$; the solution obtained was extracted with 50 ml of water under agitation for 5 min. The aqueous layer was then analyzed to determine the PMDA content; it was found that 84.6% was in the free state.

Comparison Example 1

5 kg/h of a mixture of PET from dimethyl terephthalate mixture (IV=0.6 dl/g) and 0.4% by weight of PMDA was continuously fed, after drying at 130° C. under vacuum for at least 12 h, in a counter rotating and intermeshing twin screw extruder; it was then extruded and pelletized.

The working conditions were the same as in Example 1.

The IV after extrusion was 0.62 dl/g, the melt strength 3 cN and the hanging time 16 seconds.

EXAMPLE 2

5 kg/h of a mixture of PET from dimethyl terephthalate (IV=0.6 dl/g) and 8% by weight of the concentrate obtained in Example 1, was fed, after drying under vacuum at 130° C. for at least 12 h, in a counter rotating and intermeshing twin screw extruder, as in Example 1.

The composition in weight of the composition was: PET 92%, PC 7.6%, PMDA 0.4%.

The working conditions were the same as in Example 1.

The IV of the resin after extrusion was 0.763 dl/g; the melt strength 6 cN and the hanging time 28 seconds.

EXAMPLE 3

5 kg/h of a mixture of COPET (polyethylene terephthalate copolymer containing 2% by moles of isophthalic acid units; IV=0.79 dl/g) was fed continuously, after drying at 130° C. for at least 12 h, together with 8% by weight of the concentrate of Example 1 using the extruder and the conditions of Example 1.

The IV of the extrudate was 0.964 dl/g, the melt strength 65 cN and the hanging time 125 seconds.

Comparison Example 2

0.5 kg/h of a mixture of PET from dimethyl terephthalate (IV=0.6 dl/g) and of 7.6% by weight of PC of Example 1 were continuously fed, after drying at 130° C. for at least 12 h, into the extruder and under the conditions of Example 1 and then extruded and pelletized.

The IV of the extrudate was 0.629 dl/g, the melt strength was less than 1 cN and the hanging time 3 seconds.

Comparison Example 3

5 kg/h of a mixture of COPET of Example 3 and of 7.6% of PC of Example 1 were continuously fed, after drying a 130° C. for at least 12 h, into the extruder and under the conditions of Example 1.

The IV of the extrudate was 0.87 dl/g, the melt strength 2.5 cN and the hanging time 9 seconds.

EXAMPLE 4

1 kg of polymer obtained according to Compariso Example 1 and 1 kg of polymer of Example 2 were subjecte to poly-addition in the solid state at 200° C. for 4 h. Th treatment was carried out in an agitated reactor of a capacit of 3.51 in a nitrogen stream.

The IV of the polymer was 0.862 dl/g in comparison wit 0.826 dl/g of the polymer of Comparison Example 1 sut jected to polyaddition under the same conditions as i Example 4.

EXAMPLE 5

5 kg/h of a mixture of COPET (from TPA (IV=0.79 dl/g containing 2% of isophthalic acid) with 8% by weight of PC/PMDA concentrate obtained according to Example 1 an 1% by weight of talc was fed in a counter rotating an intermeshing twin screw extruder. The mixture was dried 130° C. for at least 8 h before extrusion.

A foaming agent (isobutane) was also fed in quantit equivalent to 1% of the weight of the mixture. The extrusic conditions are the same as in Example 1 except for tl extrusion zone that was maintained at 240° C.

The expanded strand showed good stability and regul distribution of the cells.

We claim:

1. Concentrates useful as additives for aromatic polyester resins comprising:
   A) 60–99% by weight of a polycarbonate resin;
   B) 1–40% by weight of a dianhydride of a tetracarboxylic acid.

2. Concentrates according to claim 1 containing from 80 to 99% by weight of polycarbonate and 1–20% by weight of a dianhydride of a tetracarboxylic acid.

3. Concentrates according to claim 1 wherein the dianhydride is pyromellitic dianhydride.

4. Concentrates according to claim 1 wherein the polycarbonate is a resin obtained from a bisphenol and a precursor selected from diphenyl carbonate and phosgene.

5. A process for the preparation of concentrates useful as additives for aromatic polyester resins including 60–99% by weight of a polycarbonate resin and 1–40% by weight of a dianhydride of a tetracarboxylic acid comprising mixing the polycarbonate and the dianhydride in the melt in an extruder.

6. Aromatic polyester resins having high rheological characteristics of melt strength and of melt viscosity obtained by extrusion of an aromatic polyester resin added with a quantity of a concentrate of a dianhydride of a tetracarboxylic acid and a polycarbonate resin equivalent to a content of dianhydride comprised between 0.05 and 2% by weight.

7. Polyester resins according to claim 1, wherein the resin is selected from the group consisting of polyethylene terephthalate, polyethylene terephthalate copolymers in which up to 25% by weight of terephthalic acid recurring units are substituted with isophthalic acid or naphthalene dicarboxylic acids units and wherein the dianhydride used is pyromellitic dianhydride.

8. Resins according to claim 6 obtained by extrusion of the resin mixed with the concentrate of the polycarbonate resin and the dianhydride of the tetracarboxylic acid and successively by polycondensation in the solid state of the granules.

9. Resins according to claim 8, wherein the polyester resin is selected from the group consisting of the polyethylene terephthalate containing up to 25% in weight of the units deriving from isophthalic acid and naphthalene dicarboxylic acid.

10. Foamed material obtained from the resin of the claim 6.

11. The process of claim 5 wherein said concentrate includes 80–99% by weight of polycarbonate and 1–20% by weight of a dianhydride of a tetracarboxylic acid.

12. The process of claim 5 wherein the dianhydride is pyromellitic dianhydride.

13. The process of claim 5 wherein the polycarbonate is a resin obtained from a bisphenol and a precursor selected from diphenyl carbonate and phosgene.

14. Resins according to claim 7 obtained by extrusion of the resin mixed with the concentrate of the polycarbonate resin and the dianhydride of the tetracarboxylic acid and successively by polycondensation in the solid state of the granules.

15. Resins according to claim 14, wherein the polyester resin is selected from the group consisting of the polyethylene terephthalate containing up to 25% in weight of the units deriving from isophthalic acid and naphthalene dicarboxylic acid.

16. Foamed material obtained from the resin of claim 7.
17. Foamed material obtained from the resin of claim 8.
18. Foamed material obtained from the resin of claim 9.
19. Foamed material obtained from the resin of claim 14.
20. Foamed material obtained from the resin of claim 15.

* * * * *

UNITED STATES PATENT AND TRADEMARK OFFICE
CERTIFICATE OF CORRECTION

PATENT NO. : 5,776,994
DATED : July 7, 1998
INVENTOR(S) : Hussain AL GHATTA and Sandro COBROR It is certified that error appears in the above-identified patent and that said Letters Patent is hereby corrected as shown below:

Column 1, Line 42, change "Theological" to --rheological--;
Column 1, Line 45, change "Theological" to --rheological--;
Column 1, Line 59, change "Theological" to --rheological--;
Column 3, Line 43, change "2900°C." to --290°C --.

Signed and Sealed this

Tenth Day of November 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,776,994
DATED : July 7, 1998
INVENTOR(S) : Hussain AL GHATTA and Sandro COBROR It is certified that error appears in the above-identified patent and that said Letters Patent is hereby corrected as shown below:

On the cover page, after "[22] Filed: Mar. 25, 1997,"
insert --[30] Foreign Priority Application Data
    April 12, 1996  [IT] Italy ....... MI96 A 000701--

Signed and Sealed this

Twenty-fourth Day of August, 1999

Attest:

Q. TODD DICKINSON

*Attesting Officer*        *Acting Commissioner of Patents and Trademarks*